Jan. 31, 1956   P. H. TAYLOR   2,733,060
LIQUID SPRING
Filed March 12, 1952   2 Sheets-Sheet 1
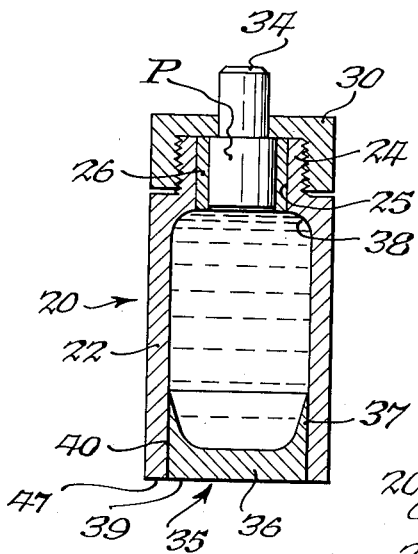
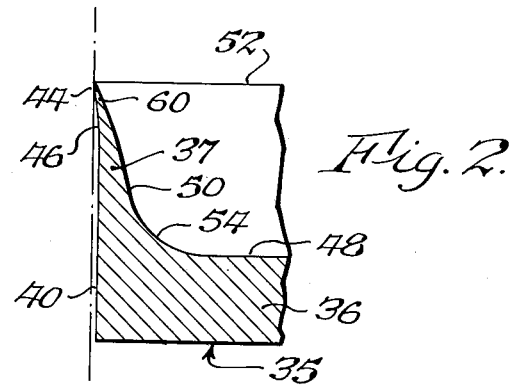
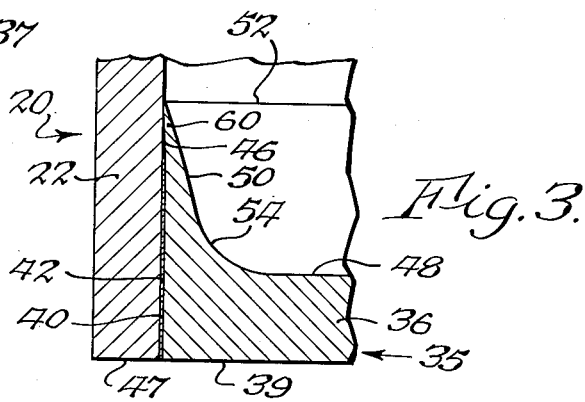
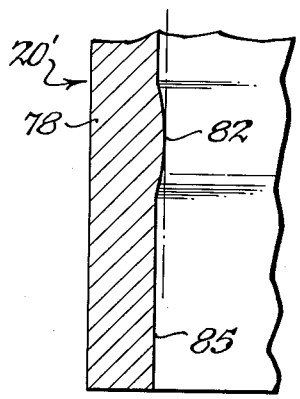
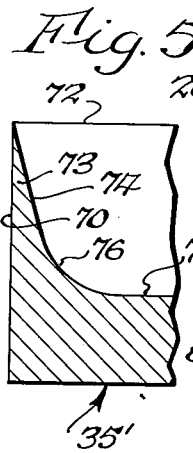
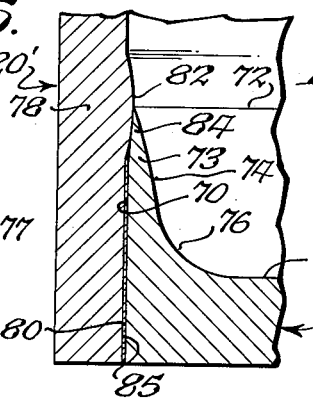
INVENTOR.
Paul H. Taylor
BY
*[signature]*
Attorney Jan. 31, 1956     P. H. TAYLOR     2,733,060
LIQUID SPRING
Filed March 12, 1952     2 Sheets-Sheet 2
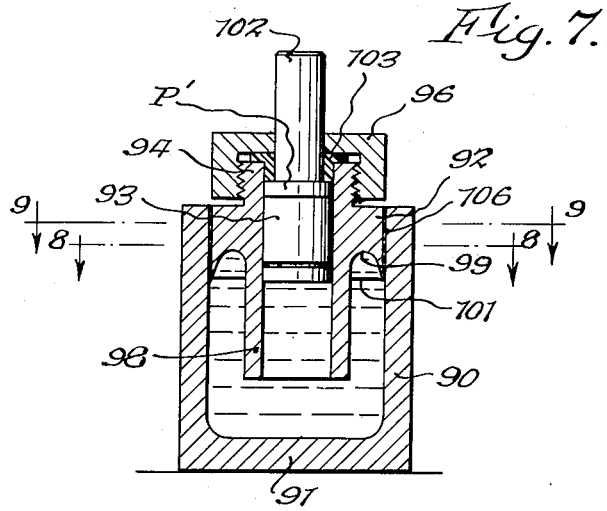
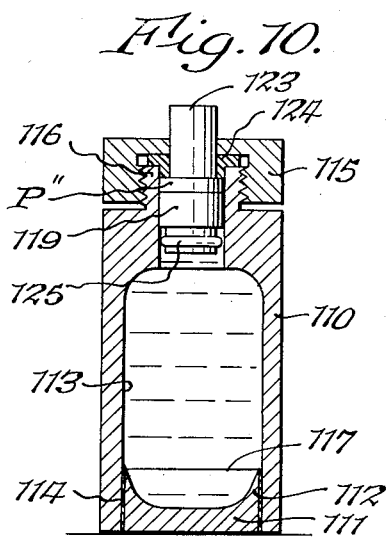
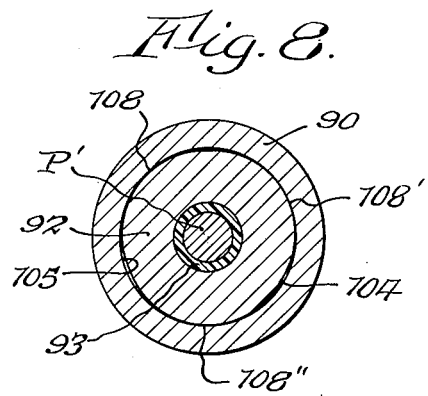
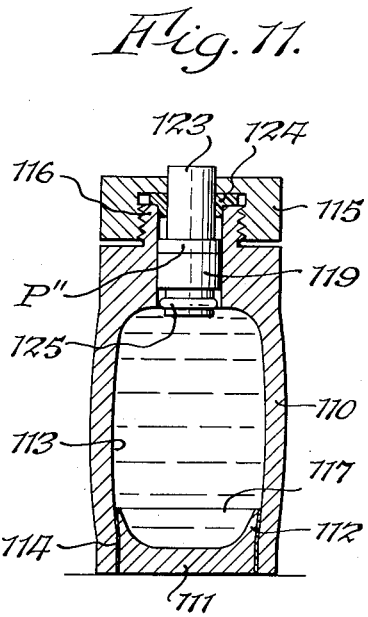
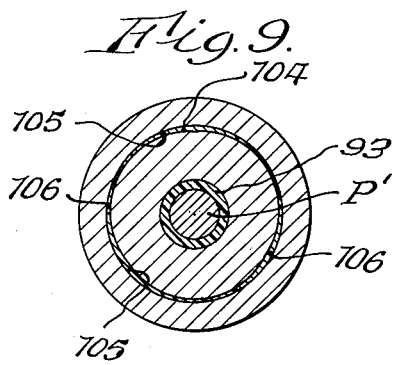
INVENTOR.
Paul H. Taylor
BY
Attorney.

United States Patent Office 2,733,060
Patented Jan. 31, 1956

2,733,060

LIQUID SPRING

Paul H. Taylor, Grand Island, N. Y., assignor to Wales-Strippit Corporation, North Tonawanda, N. Y., a corporation of New York Application March 12, 1952, Serial No. 276,189

9 Claims. (Cl. 267—64)

This invention relates to improvements in fluid springs, and more particularly in liquid springs.

Liquid springs depend for their action upon the compressibility of liquids, such as oil; and they are adapted to be interposed, just as are conventional mechanical springs, between the elements which are to be cushioned. Liquid springs are superior to mechanical springs because of the higher pressures which can be developed within them by compression of the contained liquid through action of a piston operable by one or other of the elements between which the spring is interposed.

In many commercial adaptations, moreover, liquid springs may be much smaller and much more compact than mechanical springs of equal load-carrying capacity, since a liquid spring is many times more efficient than a mechanical or like spring of comparable unit size. A liquid spring may have ten or more times the force of a correspondingly sized mechanical spring.

Heretofore, however, difficulties have been experienced in making liquid springs satisfactorily on a commercial scale. In some cases the liquid-containing vessel has been made cylindrical in form, closed at one end by an integral wall, to provide a cup-like chamber, and having its other end closed by a packed cap bored axially to receive a piston operable to compress the liquid in the chamber. Such a vessel is shown in the pending application of Robert F. Zumwalt, Serial No. 228,215, filed May 25, 1951. A vessel of this type is difficult and expensive to make. The liquid-containing cavity has to be cut with a boring tool. Aside from the cost of the boring operation, a boring cut is more or less jagged; and the tool marks in the wall of the cavity induce chattering and may also be incipient sources of cracks, leading eventually to failure of the liquid spring.

In some cases, a cylindrical or tubular body member having a smooth internal bore has been used for the body of the liquid spring and one end of this member is closed and sealed by a threaded cap, while the other end has been closed by a packed cap in which the axially-reciprocable piston is mounted, as before. Due to the high pressures developed in liquid springs, the oil or other liquid in the vessel tends to work into and along the threads of the cap connection resulting in a disruption of the seal through loss of liquid. This also causes seizing of and rupture at the thread root. Thus this type of liquid spring structure may eventually fail in one of the threads. In any event, the loss of only a drop or two of oil or liquid will affect operation of the spring through lack of the needed amount of liquid to compress.

Regardless of the structure, however, because of the very high pressures developed within a liquid spring under operating conditions, the tubular or cylindrical body wall is actually deflected or bowed outwardly progressively between the opposite ends of the device when the piston moves inwardly to compress the liquid in the vessel. In prior devices this action places an increased stress on the joints or connections between the body and the closure elements of the device. In the case of a threaded connection this stress action alone often causes the initiation of a leak of the oil or liquid along the threads resulting in the rupture at this point and failure of the device. Where the closure is brazed or welded to the body wall of the vessel the body deflection alluded to tends to place stress upon and pull apart or start the severance of the joint or seal.

One object of the present invention is to provide a liquid spring that may be manufactured more easily and at lower cost than liquid springs of previous designs.

Another object of the invention is to provide a liquid spring in which the interior walls or faces of the liquid-containing vessel can be made smooth and with a high degree of polish thereby to avoid failure or fatigue and increase the life of the device.

Another object of the invention is to produce a device of this sort of rugged structure that will stand up under the severe conditions to which it may be subjected, and wherein loss of oil or other liquid may be avoided.

Another object of this invention is to construct a liquid spring having novel and improved means for retaining a positive seal at the connection or joint between parts of the device which are subjected to high developed pressures.

A related object of the invention is to provide in a liquid spring having a tubular body, novel means for closing an end thereof in a manner to form a seal which operates to increase sealing action as the pressures developed in the vessel increase.

A further object of the invention is to provide a novel closure element for sealing the open end of the body of a liquid spring, which may be brazed or welded in position and which has means automatically operable, by increase in pressures developed in the vessel, to progressively increase the seal between the body of the spring and the closure element.

A still further object of the invention is to provide a closure element for the above purpose having a part engageable with but unattached to the spring body and which may flex to increase the sealing action of the element upon increase in internal pressure.

A further object of this invention is to construct a liquid spring having a novel connection between the body and a closure element therefor, which, upon increase in pressure in the vessel acts to automatically increase the sealing action between such parts and avoids the application of disruptive stresses therebetween.

A related object is to provide a liquid spring having a novel closure which is operable under increase in internal pressure to flex with and in the direction of the body wall deflection to thereby maintain the seal therebetween intact.

A further object of the invention is to provide a closure device for a liquid spring which is so constructed that upon increase in internal pressure in the vessel, a part of the closure will flex in advance of, and then proceed to further flex with, the deflection of the body wall so that tension is avoided at the juncture between the body and its closure.

Other objects of the invention will be apparent hereinafter from the specification and from the recital of the appended claims.

In the drawings:

Fig. 1 is an axial section of a liquid spring constructed according to one embodiment of this invention;

Fig. 2 is an enlarged fragmentary axial section of a part of the novel closure, seen in Fig. 1;

Fig. 3 is a similar fragmentary section, illustrating the closure of Fig. 2 in assembled relation to the body of the pressure vessel;

Fig. 4 is a fragmentary axial section, on an enlarged scale, illustrating a modified formation of vessel wall;

Fig. 5 is an enlarged fragmentary axial section of a modified closure for use with the wall formation of Fig. 4;

Fig. 6 is a section, similar to Fig. 3, illustrating the parts of Figs. 4 and 5 assembled;

Fig. 7 is an axial section of a liquid spring constructed according to another embodiment of this invention;

Fig. 8 is a transverse section through the device of Fig. 7, taken approximately in the plane of line 8—8 of Fig. 7 but with the braze removed for clearness in illustration;

Fig. 9 is a similar section taken approximately in the plane of line 9—9 of Fig. 7 but showing the braze;

Fig. 10 is an axial section of a liquid spring made according to a still further embodiment of the invention; and Fig. 11 is an axial section showing the spring of this last modification under working load, and illustrating diagrammatically and somewhat exaggeratedly, the deflection of the body wall and of the closure when subjected to a high internal pressure.

In Figs. 1 to 3, one example of my improved liquid spring is shown. It includes a body member 20 of cylindrical or tubular form, the wall 22 of which is preferably of substantially uniform thickness from end to end. One end of the body member 20 has an axial extension 24 of reduced diameter within a bore 25 of which is secured a tubular bearing sleeve 26. This sleeve operatively supports a piston P, which is reciprocable axially of the body member 20 and relative to the latter.

The bearing member 26 may be of the same length as the bore 25. The extension 24 is threaded externally to receive an internally threaded cap or closure 30. The piston P is shouldered, to engage the cap and has an axially-projecting stem portion 34 which passes through a central hole in the cap. When the cap 30 is screwed upon the extension 24 of the body 20, as shown, it abuts the outer ends of the latter and of the sleeve 26 and serves as a stop for outward movement of piston P.

While not shown, the bearing sleeve 26, the extension 24 and/or the cap 30 may be provided with suitable packing means to prevent escape of liquid at this end of the device.

As illustrated in Figs. 1 and 3, the opposite initially open end of the cylindrical wall 22 of the body 20 is closed by an end member 35 forming part of the novel closure and sealing element of the present invention. The closure member 35 has an end wall 36 and a side wall 37 that decreases in thickness, tapering to a thin edge at its upper end as shown in Fig. 2. The lower portion of the outside surface of side wall 37 is cylindrical and of one diameter as denoted at 40. Above the cylindrical portion 40, which extends from the bottom for the major portion of the height of the closure, the wall 37 of the closure is bellied outwardly as denoted at 46 to joint the uppermost portion of the closure wall whose outside surface 44 is also cylindrical but larger in diameter than cylindrical outside surface 40. The surface 44 is adapted to closely engage in a sliding fit the adjacent inside wall surface of vessel wall 22. When the closure element 35 is in the attached position shown its lower or outer end face 39 is flush with the transverse lower end face 47 of wall 22 of the body member 20.

It will be seen that, prior to the insertion of the closure 35 and its attachment to the body wall 22, a suitable tool or tools or other means may readily be inserted into the interior of body member 20, and its inside wall being cylindrical may readily be smoothed up and highly polished to remove tool marks and other irregularities. Likewise the upper or inner end of the body or chamber 20 may be carefully shaped to form a smoothly polished rounded annular corner or shoulder 38 terminating at or coinciding with the inner ends of bore 25 and bearing sleeve 26.

To secure the closure 35 in position, welding or brazing alloys or other materials of similar type may be employed. This procedure may be followed, in the construction shown in Figs. 1 to 3, because the outside cylindrical surface 40 of the wall 37 of the closure member 35 is slightly smaller in diameter than the inside surface of wall 22 of the body member 20. In this way a narrow cylindrical space is provided between the inside wall 22 of the body member 20 and the outside wall 40 of the closure 36. A selected brazing or welding alloy may be introduced into this space to form a tight seal 42. The sealing material may be treated to form the connection in accordance with standard procedure.

The faces 40 and 44 of the element 35 merge gradually one into the other through intervening narrow curved portion 46. The brazed or welded joint or seal 42 is thus enabled to taper at its upper end to a thin feathered edge, which as shown, is overhung by the upper outside wall section 44 of the closure 35.

The inner face 48 of the bottom wall 36 of the closure plug 35 is substantially flat. As previously stated the side wall 37 of the closure decreases in thickness tapering to a thin edge at its upper end. The inner annular side wall 50 of a closure 36 extends downwardly and inwardly therefrom, from a thin, approximately feathered, top marginal edge 52 to a curved or rounded annular portion 54 by which it merges smoothly into and joins the bottom face 48.

The construction described provides a smooth cup-like plug structure 35, which at its upper edge 52 closely fits the inside face of the wall 22 without the presence of any abrupt shoulders or other impediment. Thus the interior of the chamber of the vessel is smooth. Uniform pressures against the inside face of the vessel may therefore, be effected in all directions.

It is important to note that the described construction, provides, at the top of the closure element 35, an annular lip section 60 of tapered form which becomes progressively thinner from the upper end of the seal or joint 42 to the thin upper marginal edge 52. Since this lip section 60 closely bears at all times against the cylindrical inner face of wall 22, and is unattached thereto, and since it is a part of the plug side wall above the seal 42, it is free to flex relatively to the lower part of the plug and also relatively to the adjacent face of wall 22.

The advantages gained by this novel arrangement will be later fully described.

The modified liquid spring shown in Figs. 4 to 6 embodies the same novel features as described in connection with the form of the invention shown in Figs. 1 to 3 inclusive.

In this modified construction however, the closure plug or sealing member 35' has an outer or side face 70 which is a cylinder of uniform diameter from top to bottom. Otherwise the member 35' is of general cup-like formation, like closure 35, terminating, also, in a thin circular top edge 72.

The side wall 73 of the member 35', as in the previously described embodiment of the invention, decreases in thickness from the base of the closure to its top edge. This again provides a flexible lip at the upper edge of the closure. The inside wall 74 of the member 35' inclines downwardly and inwardly and has a round 76 where it merges with the transverse bottom wall 77 of the closure.

The body 20' of the vessel, of which only a portion is shown in Figs. 4 and 6, has a cylindrical wall 78 of generally uniform thickness, and may be generally of the form shown in Fig. 1. The inner face of the wall 78 is formed, however, with a slightly projecting annular protuberance 82 rounded smoothly into the wall face, see Fig. 4.

The inner diameter of the protuberance 82 is the same as the outer diameter of the face 70 of the plug 35'. It is located, so that, when the member 35' is in the assembled position of Fig. 6, the upper tapered edge portion 84 of the plug may engage closely with the part 82.

This arrangement provides a narrow cylindrical space between the plug 35' and the inside surface 85 of the vessel wall below protrusion 82. Into this space a welded or brazed seal or joint 80 may be introduced, as in the previous construction. This joint will have a thin feathered edge terminating at the curved lower portion of projection 82, thus avoiding an abrupt shoulder at this point.

Fig. 7 shows how the novel features of the welded and sealed connection of the present invention may be applied in a liquid spring having a cup-shaped body member or vessel 90, one end of which is closed by an integral wall as denoted at 91. The opposite end of the vessel 90 is closed by a closure member 92 which is bored axially for the reception of a piston P', and of a seal 93 that surrounds the piston and is pressed thereon. Seal 93 may be made of plastic.

To provide for an extra long stroke for piston P' the closure plug has an inwardly or downwardly projecting extension 98 which projects well down into the body 90. The extension 98 merges at its upper part into the rounded annular inner end wall 99 of the closure plug.

The closure plug 92 has an upwardly-projecting extension 94 to which is secured a screw cap 96. Piston rod 102 projects upwardly through this cap and through a seal 103 which is interposed between the cap and closure extension 94.

The member 92, it will be observed, is secured at the open end of the body member 90 in a manner similar to the closures 35 and 35' shown and described in the previous constructions. Here, again, the closure has an outer surface 104 (Fig. 9) which for the major part of its height is spaced slightly from the adjacent inside surface 105 of the vessel 90. Here, again, the wall of the closure member decreases in thickness toward its inner end. Here, again, brazing or welding material 106 is introduced between the surfaces 104 and 105 to provide a brazed or welded seal or joint between the closure member and the vessel. Thus, the seal or joint 106 secures the closure to the vessel wall in a manner to leave a free annular sharp edged lip 101 inwardly beyond the joint, which may lie close against the vessel wall.

In this embodiment of the invention, however, the outside wall 105 of the closure member is shaped, as clearly shown in Figs. 8 and 9, so that it has contact in position of rest only at three points 108, 108', and 108" around its periphery with the inside 105 of the pressure vessel. This assures proper centering of the closure member in the pressure vessel without interfering with the sealing action of the sharp-edged lip of the closure member under pressure. The lip 101 is operable, as before, to progressively and additionally provide sealing action with increase in pressure developed in the pressure vessel.

Instead of shaping the lip 101 on its outside so that in position of rest it only has three-point contact with the inside of vessel 90, it can be shaped as are the lips in the previously described embodiments of the invention to have contact all around its periphery with the inside of the pressure vessel, that is, lip 101 might be made with a cylindrical outside surface to fit the cylindrical inside surface of the pressure vessel.

A further embodiment of the invention is shown in Figs. 10 and 11. In Fig. 11, the spring is shown under operating load so that the body or vessel 110 is distended. In normal position of rest, shown in Fig. 10, the body is cylindrical like the body 20 of Fig. 1. The lower end of the body 110 is closed by a closure member 111. This closure member has, as before, a side wall 112 that decreases in thickness toward its inner end. In the embodiment shown in Figs. 10 and 11, however, the closure member has a cylindrical outside surface for its full height that has a slightly smaller diameter than the diameter of the inside wall 113 of the pressure vessel.

A space is left, as before, then for the braze or weld 114 by which the closure member is joined or bonded to the pressure vessel.

The upper end of vessel 110 is closed by a cap 115 that threads onto the projection or neck 116 of the pressure vessel. The piston P" has a seal 119 pressed thereon; and the stem 123 of the piston projects outwardly through cap 115. A seal 124 is interposed between cap 115 and the neck portion 116 of the pressure vessel. Seal 119 may be of nylon or other suitable material. A snap-ring 125 is mounted on piston P" to limit its upward, that is, outward, movement.

To prepare the various pressure vessels or liquid springs disclosed above for use, and referring to Fig. 1 as an example, the cap 30 and piston P are removed. The interior of the vessel is then completely filled with oil or other liquid and the piston replaced and the cap secured in the position shown. The piston, being in retracted position, no intervening air space is left in the vessel.

For use, any of the liquid springs may be placed under a desired preload pressure, as by inserting the spring between two relatively movable parts that in position of rest are so spaced that they apply force to the end of the piston stem 34 to force the piston inwardly. The piston is thus held where an initial compression of the liquid in the vessel is present. The novel construction of the devices shown enables the initial pressure to exert a substantially uniform fluid pressure to the interior of the vessels, in all directions.

If now, one of the devices is to be used, for example in stamping die operations, additional force is applied to the piston P, P', or P", as the case may be. The resulting pressure developed may be very great, perhaps as much as 20,000 pounds per square inch. Under such conditions the tubular wall of the vessel will flex and be distended.

Fig. 11 shows diagrammatically and in exaggerated manner what happens when the spring is put under working load. The vessels 20, 20' and 90 of Figs. 1 to 9 inclusive similarly flex and distend under working load.

The pressure, being uniformly directed, causes the wall of the pressure vessel to deflect progressively from its opposite ends so that the greatest distention is approximately at the mid portion, as shown in Fig. 11.

In earlier constructions of liquid springs, such action tended to force a separation between the wall and the closure by breaking open or disrupting the joint or connection between the closure and the pressure vessel. If the connection was of a threaded type the tension developed between the two members caused passage of the liquid under pressure along the threads. Where a closure or plug was used that had a side wall of uniform thickness from end to end, and this closure or plug was connected to the pressure vessel by a brazed or welded joint or seal, the plug or closure having an abrupt shoulder at its connection with the vessel wall, would tend to direct stresses or tensions at the joint, causing eventual separation.

In the present novel construction however such stresses and separation of the parts at the connection cannot occur. This is due to the taper in thickness of the marginal inner portion of the closure plug.

In the cases of the closures shown in Figs. 1 to 9 inclusive this tapered marginal portion lies against the inner face of the wall of the vessel. This portion, as shown at 60 in Figs. 1 to 3 inclusive, is of less cross sectional dimension at its greatest area than the thickness of wall 22. Hence, when sufficiently high pressures are developed to cause deflection of the body wall 22, as described, the tapered section 60 will also be deflected in the same direction and always in advance of and relatively to a greater extent than the adjacent areas of the wall 22. Therefore the section 60 will actually more forcibly engage the wall 22, the greater the pressure that is applied against it. Under such conditions the section 60 effectively prevents fluid from getting in behind that section, thereby protecting the joint or seal 42 at all times from being placed under tension or stress and possible separation.

The modified constructions of Figs. 4 to 6 and Figs. 7 to 9 likewise are provided with the same advantages as those just described, as will be apparent.

Even where the closure does not have direct contact with the inside wall of the pressure vessel, but where the braze or weld extends for the full height of the closure, as is the case in the embodiment shown in Figs. 10 and 11, the thin-walled lip 117 of the closure will at all times protect the seal. This is because, as before, the tapered section or lip 117 will deflect in the same direction as the wall of the pressure vessel and will follow that wall when high pressures are developed in the pressure vessel by working loads. Therefore, no matter how great the pressure in the pressure vessel, the lip 117 will protect the seal.

The novel liquid springs here disclosed are all of extremely rugged construction, are fluid tight, and in use will give long service without separation and disruption of the seals or joints between the bodies thereof and the closure elements as a result of stresses or tension.

While the invention has been described in connection with several different embodiments thereof, it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A liquid spring, comprising a vessel filled with liquid to be compressed, said vessel having a tubular body member of substantially uniform thickness, a closure plug member disposed in an end of said vessel, one of said two members having an annular offset portion, said closure plug member being secured fixedly to said tubular body member by a sealing and adhesive material interposed between said members, and said closure member having, in the region of said annular offset portion, an annular, marginal lip portion that tapers in thickness and that is of less thickness than said tubular body member, and that has contact around its periphery with said tubular body member and that may flex to move progressively against and with said body member under pressures developed in said vessel, and a piston movable in said vessel to place the liquid therein under compression to develop high pressures.

2. A liquid spring comprising a vessel having a tubular side wall and which is open at one end at least, a closure for closing said one end of said vessel, said closure being cup-shaped and having its cavity facing inwardly of said vessel, said closure having a side wall which decreases in thickness from the bottom of said closure toward the inner end thereof and which adjacent its inner edge is of less thickness than the side wall of said vessel and forms a flexible marginal lip, the outside diameter of said portion, at least, of the side wall of said closure being less than the inside diameter of the adjacent portion of the tubular side wall of said vessel whereby there is a space between said portions of the two walls, a sealing and adhesive material filling said space and fixedly securing the closure to said vessel, said vessel being adapted to be filled with a liquid, and a piston reciprocably mounted in said vessel and adapted on movement inwardly of said vessel to compress said liquid.

3. A liquid spring comprising a vessel having a tubular side wall and which is open at one end at least, an imperforate closure for closing said one end of said vessel, said closure being cup-shaped and having its cavity facing inwardly of said vessel, said closure having a side wall of one outside diameter for a portion of the height of said closure and which has an offset portion adjacent its inner end which is of greater outside diameter and which decreases in thickness to the inner end of said closure, said offset portion forming a flexible marginal lip, the outside diameter of the first-named portion of the side wall of said closure being less than the inside diameter of the side wall of said vessel whereby a space is provided between the said first-named portion of said closure side wall and the adjacent portion of said vessel side wall, a sealing and adhesive material filling said space and fixedly securing the closure to said vessel, said offset portion of said closure side wall engaging the adjacent portion of said vessel side wall, said vessel being adapted to be filled with a liquid, and a piston reciprocably mounted in said vessel and adapted on movement inwardly of said vessel to compress said liquid.

4. A liquid spring comprising a vessel having a tubular side wall and which is open at one end at least, said side wall having an internal protuberance spaced from said one end, a closure for closing said one end, said closure being cup-shaped and having its cavity facing inwardly of said vessel, said closure having a side wall which decreases in thickness toward its inner end to form a thin marginal lip and which is spaced from the inside of the tubular side wall of said vessel outwardly of said protuberance and which contacts at its inner thinner lip portion with said protuberance, a sealing and adhesive material filling the space between said closure and said vessel and fixedly securing said closure to said vessel, said vessel being adapted to be filled with a compressible liquid, and a piston reciprocably mounted in said vessel and adapted on movement inwardly of said vessel to compress said liquid.

5. A liquid spring comprising a tubular, cup-shaped vessel closed at one end by an integral end wall, a closure for the other end of said vessel, said closure having a centrally-disposed tubular portion extending into said vessel, and an annular side wall and having a concave inner face between said tubular portion and said side wall, said side wall tapering in thickness toward the inner end of said closure to form a thin marginal lip, a sealing and adhesive material between the side wall of said closure and the inside wall of said vessel fixedly securing said closure to said vessel, said vessel being adapted to be filled with a liquid, and a piston reciprocable in the tubular portion of said closure and adapted on movement inwardly of said vessel to compress said liquid.

6. A liquid spring comprising a vessel having a tubular side wall which is open at one end at least, a closure for closing said one end of said vessel, said closure being cup-shaped and having its cavity facing inwardly of said vessel, said closure having a side wall which decreases in thickness toward its inner end to provide a thin marginal lip and having an outside surface shaped adjacent its inner end to have contact around its periphery at a plurality of spaced points only with the inside of the side wall of said vessel when the spring is at rest, the remaining portion of the outside surface of said closure side wall being spaced from the inside of the side wall of said vessel, a sealing and adhesive material filling the space between said remaining portion and the inside of the side wall of said vessel and fixedly securing said closure to said vessel, said vessel being adapted to be filled with a compressible liquid, and a piston reciprocably mounted in said vessel and adapted on movement inwardly of said vessel to compress said liquid.

7. A liquid spring comprising a vessel filled with a compressible liquid, a piston reciprocable in said vessel and having a portion projecting therefrom, said piston being operable on movement inwardly of said vessel to compress said liquid, said vessel having a tubular body portion forming the peripheral wall of said vessel, and a closure plug for closing one end of said tubular portion, said closure plug fitting into said one end of said tubular portion and being internally dished on its inner face to provide an annular, peripheral wall portion which tapers in thickness inwardly terminating in a thin marginal lip, said lip having peripheral contact with the inside of the bore of said tubular body portion and being flexible, whereby it may flex with said body portion under the high pressures developed in said vessel, the peripheral surface of the remainder of said closure plug being spaced from the inside of the bore of said tubular body but being secured fixedly around its periphery to said tubular body portion by a sealing and adhesive material that is in the space between the periphery of said closure plug and the inside surface of said tubular body portion.

8. A liquid spring, comprising a vessel filled with a compressible liquid, a piston reciprocable in said vessel and having a portion projecting therefrom, said piston being operable on movement inwardly of said vessel to compress said liquid, said vessel having a tubular body, a closure plug for closing one end of said body and extending therewithin and having a peripheral wall, a portion of which, at least, is in parallel spaced relation to the inside surface of said tubular body, said closure plug being secured fixedly to said body wall by a sealing and adhesive material around the periphery of said plug between said portion of said plug and said body, and said closure plug having, inwardly of said body axially beyond said material, a marginal lip section which is integral with said portion of said plug and which is in contact around its periphery with said body and which is flexible, whereby it may flex and maintain contact with said body under the high pressures developed in said vessel.

9. A liquid spring, comprising a vessel filled with a compressible liquid, said vessel having a tubular body, a closure plug fitting into said tubular body for closing one end of said vessel, said closure plug having a peripheral wall, the peripheral surface of at least a portion of which is in parallel spaced relation to the inside surface of said tubular body, said closure plug being secured fixedly to said body by a sealing and adhesive material between said portion of said plug and the opposed inside surface of said body, said closure plug being dished on its inner face and having a relatively flexible marginal lip bounding its dished portion and decreasing in thickness toward its inner end so that it will flex radially when the liquid in the vessel is compressed, and a piston movable in said vessel to place the liquid therein under compression.

References Cited in the file of this patent

UNITED STATES PATENTS

| | | |
|---|---|---|
| 2,062,589 | Lucas | Dec. 1, 1936 |
| 2,266,691 | Mercier | Dec. 16, 1941 |
| 2,333,095 | Dowty | Nov. 2, 1943 |
| 2,539,842 | Katz | Jan. 30, 1951 |
| 2,581,856 | Gruss | Jan. 8, 1952 |

FOREIGN PATENTS

| | | |
|---|---|---|
| 105,053 | Great Britain | Mar. 21, 1917 |